United States Patent
Kennedy et al.

(10) Patent No.: US 9,473,963 B2
(45) Date of Patent: Oct. 18, 2016

(54) INTERACTIVE RF SYSTEM TESTING SYSTEM AND METHOD

(71) Applicants: Joseph P. Kennedy, Great Falls, VA (US); Sharif Shaher, Clifton, VA (US)

(72) Inventors: Joseph P. Kennedy, Great Falls, VA (US); Sharif Shaher, Clifton, VA (US)

(73) Assignee: Echo Ridge LLC, Sterling, VA (US)

( * ) Notice: Subject to any disclaimer, the term of this patent is extended or adjusted under 35 U.S.C. 154(b) by 111 days.

(21) Appl. No.: 14/213,192

(22) Filed: Mar. 14, 2014

(65) Prior Publication Data

US 2014/0273870 A1    Sep. 18, 2014

Related U.S. Application Data

(63) Continuation-in-part of application No. 14/011,278, filed on Aug. 27, 2013, and a continuation-in-part of application No. 12/787,699, filed on May 26, 2010, now Pat. No. 8,521,092.

(60) Provisional application No. 61/783,199, filed on Mar. 14, 2013, provisional application No. 61/217,001, filed on May 27, 2009.

(51) Int. Cl.
*H04W 24/06*      (2009.01)
*H04B 17/391*     (2015.01)
*H04B 17/00*      (2015.01)

(52) U.S. Cl.
CPC .......... *H04W 24/06* (2013.01); *H04B 17/391* (2015.01); *H04B 17/0085* (2013.01)

(58) Field of Classification Search
USPC ...................... 455/67.11, 67.13, 115.1, 226.1
See application file for complete search history.

(56) References Cited

U.S. PATENT DOCUMENTS

| | | | | |
|---|---|---|---|---|
| 5,313,209 | A | * | 5/1994 | Michaels, Jr. ........... H04K 3/22 342/13 |
| 5,794,128 | A | * | 8/1998 | Brockel ............ H04B 17/3912 455/506 |
| 5,886,626 | A | * | 3/1999 | Hynes ...................... H04K 3/94 342/13 |
| 5,917,449 | A | | 6/1999 | Sanderford et al. |
| 6,094,168 | A | | 7/2000 | Duffett-Smith et al. |
| 6,236,363 | B1 | * | 5/2001 | Robbins ................. H01Q 3/267 342/169 |
| 6,275,705 | B1 | | 8/2001 | Drane et al. |
| 6,393,292 | B1 | | 5/2002 | Lin |
| 6,492,945 | B2 | | 12/2002 | Counselman, III et al. |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio", Robotics Institute, Carnegie Mellon University, May 2004, 60 pages.

*Primary Examiner* — Nay A Maung
*Assistant Examiner* — Erica Fleming-Hall
(74) *Attorney, Agent, or Firm* — Duane Morris LLP

(57) ABSTRACT

A system and method for evaluating the interactivity of RF devices in a virtual RF environment having selective virtual spectrum users remotely controlled by a web browser, where the virtual spectrum users have selectable interactivity parameters, and the virtual RF spectrum can be selectively changed, and the performance of the virtual spectrum users is evaluated and assigned scores as a function of the evaluation to determine which virtual spectrum user receives the highest amount of points.

24 Claims, 8 Drawing Sheets

(56) References Cited

U.S. PATENT DOCUMENTS

| | | | |
|---|---|---|---|
| 6,522,890 B2 | 2/2003 | Drane et al. | |
| 6,571,082 B1 | 5/2003 | Rahman et al. | |
| 6,865,395 B2 | 3/2005 | Riley | |
| 6,978,131 B1 | 12/2005 | Lee | |
| 7,035,650 B1 | 4/2006 | Moskowitz et al. | |
| 7,171,345 B2 | 1/2007 | Mocek | |
| 7,398,086 B2 | 7/2008 | Morgand et al. | |
| 7,508,868 B2 * | 3/2009 | Chang | H04B 17/0087 375/224 |
| 7,539,489 B1 * | 5/2009 | Alexander | H04W 24/06 370/241 |
| 7,620,368 B2 | 11/2009 | Wang et al. | |
| 7,773,995 B2 | 8/2010 | Rappaport et al. | |
| 8,000,656 B1 | 8/2011 | Jiao et al. | |
| 8,018,383 B1 | 9/2011 | Schantz et al. | |
| 8,086,187 B1 | 12/2011 | Davis et al. | |
| 8,126,453 B2 | 2/2012 | Wang | |
| 8,229,416 B2 | 7/2012 | Akman et al. | |
| 8,238,834 B1 * | 8/2012 | Bharghavan | H04W 24/06 379/1.01 |
| 8,270,910 B2 | 9/2012 | Picard | |
| 8,332,198 B1 | 12/2012 | Barclay et al. | |
| 8,339,142 B2 | 12/2012 | Oowada | |
| 8,467,735 B2 * | 6/2013 | Giles | H04B 17/309 455/67.11 |
| 9,069,749 B1 * | 6/2015 | Rumsby | G06F 11/261 |
| 2002/0028659 A1 * | 3/2002 | Adams | H04L 12/2697 455/67.11 |
| 2002/0160717 A1 | 10/2002 | Persson et al. | |
| 2004/0203434 A1 * | 10/2004 | Karschnia | G05B 19/0421 455/67.11 |
| 2005/0043933 A1 * | 2/2005 | Rappaport | H04L 41/22 703/1 |
| 2005/0053008 A1 * | 3/2005 | Griesing | H04W 24/06 370/241 |
| 2005/0085223 A1 | 4/2005 | Liu | |
| 2005/0200525 A1 | 9/2005 | Duffett-Smith et al. | |
| 2005/0260962 A1 | 11/2005 | Nazrul et al. | |
| 2006/0094365 A1 | 5/2006 | Inogai et al. | |
| 2006/0128315 A1 | 6/2006 | Belcea | |
| 2006/0148429 A1 | 7/2006 | Inogai et al. | |
| 2006/0174162 A1 | 8/2006 | Varadarajan et al. | |
| 2006/0229018 A1 * | 10/2006 | Mlinarsky | H04B 17/0087 455/67.11 |
| 2006/0229020 A1 * | 10/2006 | Mlinarsky | H04B 17/391 455/67.14 |
| 2006/0233111 A1 * | 10/2006 | Wright | H04B 17/0087 370/241 |
| 2007/0019769 A1 | 1/2007 | Green et al. | |
| 2007/0072552 A1 | 3/2007 | Jonsson et al. | |
| 2007/0127559 A1 * | 6/2007 | Chang | H04B 17/0087 375/213 |
| 2007/0223571 A1 | 9/2007 | Viss | |
| 2008/0026748 A1 | 1/2008 | Alexander et al. | |
| 2008/0057873 A1 | 3/2008 | Huang et al. | |
| 2008/0084951 A1 | 4/2008 | Chen et al. | |
| 2009/0094492 A1 | 4/2009 | Music et al. | |
| 2009/0113245 A1 | 4/2009 | Conner | |
| 2009/0143020 A1 * | 6/2009 | Kotabe | H04L 12/2697 455/67.11 |
| 2009/0213828 A1 | 8/2009 | Brundage et al. | |
| 2009/0233621 A1 | 9/2009 | Rhoads et al. | |
| 2010/0062722 A1 | 3/2010 | Dykema et al. | |
| 2010/0099361 A1 | 4/2010 | Lundstrom et al. | |
| 2010/0240317 A1 * | 9/2010 | Giles | H04B 17/309 455/67.13 |
| 2010/0261431 A1 * | 10/2010 | Olgaard | G01R 31/31713 455/67.11 |
| 2010/0289688 A1 * | 11/2010 | Sherman | H04K 3/228 342/16 |
| 2011/0124295 A1 | 5/2011 | Mahjoubi Amine et al. | |
| 2011/0136457 A1 | 6/2011 | Yu | |
| 2011/0208504 A1 * | 8/2011 | Kim | H04L 41/145 703/21 |
| 2011/0223869 A1 | 9/2011 | Harteneck | |
| 2011/0287721 A1 | 11/2011 | Haran | |
| 2011/0306306 A1 | 12/2011 | Reed | |
| 2012/0071107 A1 | 3/2012 | Falck et al. | |
| 2012/0225624 A1 | 9/2012 | Kyosti et al. | |
| 2013/0029608 A1 | 1/2013 | Kuo et al. | |
| 2013/0231060 A1 | 9/2013 | Ozaki et al. | |
| 2014/0051363 A1 | 2/2014 | Kennedy et al. | |

* cited by examiner

INTERACTIVE RF SYSTEM TESTING SYSTEM AND METHOD

This application is a continuation in part to U.S. patent application Ser. No. 14/011,278 filed Aug. 27, 2013, which claims priority to U.S. Pat. No. 8,521,092 filed May 26, 2010, which claims the priority of U.S. Provisional Pat. App. Ser. No. 61/217,001 filed on May 27, 2009, the disclosures of which are hereby incorporated by reference. This application also claims priority to U.S. Provisional Pat. App. Ser. No. 61/783,199 filed Mar. 14, 2013.

The present disclosure relates to the field of behavior evaluation of radio frequency ("RF") systems. More specifically, this disclosure describes a system and method for providing a laboratory-based, field realistic, virtual RF environment where RF systems (communications, radar, jammers, etc.) produced by unassociated third parties can participate in an interactive gaming environment to evaluate behavior.

BACKGROUND

Radio spectrum is scarce and the Federal Communications Commission ("FCC"), Department of Defense ("DoD") and other international spectrum management organizations are constantly looking for ways to more efficiently utilize this limited spectrum. Demand for spectrum is continuing to rise due to the explosive growth of data, voice, messaging, and video applications. One solution to meeting the need for improved spectral efficiency as measured by bits/Hz/user is adaptive radios (also referred to as dynamic spectrum access (DSA) or cognitive radios (CR)). Adaptive radios can change their transmission characteristics to maximize transmission capacity and coverage while conserving spectral usage. Because CR represents a rich technical research area, as well as a potentially significant commercial and military products market opportunity, large numbers of research and development entities from academic, commercial and government organizations are participating in activities towards producing CR devices and systems.

One of the challenges of deploying adaptive radio technology is that it cannot be fielded without comprehensive behavior evaluation, and it cannot be evaluated in a densely populated, live environment for fear of potentially interfering with existing spectrum users (primary users). Field evaluation is preferable to lab evaluation but requires a realistic environment where it can be verified that the System under Test (SUT) will not interfere with primary users or other spectrum users. Laboratory evaluation is more cost and schedule effective, repeatable, controllable and observable, but generally lacks in realism, especially with respect to RF environmental considerations including the interactive effects of other devices/systems operating in the RF environment. These interactive effects can be between devices/systems that are adaptive/cognitive and operate in different spectrum bands, but dynamically change their frequencies in response to spectrum conditions. Addressing this phenomena has not been a part of prior art testing approaches.

There is an established and growing need to comprehensively evaluate behavior of these new adaptive devices/systems in known and postulated environments which include other representative RF systems to establish behavior characteristics. Traditional evaluation methods are increasingly stressed by the proliferation and diversity of the devices/systems and operating environments. Historically, device/system evaluation has fallen into two broad categories, field evaluation and laboratory simulation/evaluation. Field evaluation as illustrated in FIG. 1 involves placing some number of devices in a realistic field environment and exercising them to evaluate performance against specified functionality. Full-featured field evaluations place the wireless transceivers in a field scenario containing some representative RF environment where they will be operated while evaluation data is collected. These sorts of evaluations are often expensive and complex to orchestrate, and can lack flexibility since mixes of test transceiver numbers/types/locations, incumbent RF user numbers/types/locations and RF propagation conditions cannot be systematically varied to collect comprehensive data. FIG. 1 schematically depicts a typical field evaluation equipment setup. Wireless Transceiver Units Under Test (UUT) 100 operate in some RF environment 110. The RF emissions are subject to the noise, path loss, multipath transmission and interferers found in the local RF environment 110. Test instrumentation 120 is established to measure the performance of the UUT and other primary users (PU) of the RF environment. In order to accomplish a field evaluation of this variety, the UUT 100 must be physically located in the evaluation RF environment 110, and test instrumentation 120 must be constructed. In order to vary the numbers/types/locations of UUT and PU, physical units must be acquired and placed in the RF environment. In order to vary the RF environment, different field venues must be available. Additionally, test instrumentation must be provided and adapted for each UUT/PU/test environment scenario where testing is to be accomplished.

Many factors must be considered when selecting and configuring the field evaluation area including the specific type and host platform for the SUT, the characteristics and quantity of other RF devices and interferers in the environment, and environmental factors that affect the radio propagation including terrain and morphology. Field evaluation methods have been viewed as the most realistic, but many growing challenges limit their ability to be compelling. These challenges include:

Difficulty and complexity in evaluating high platform dynamic systems

More devices/systems to evaluate

More functionality & complexity to exercise including adaptive/cognitive behavior Evaluation ranges require a broad set of realistic physical layouts Requirements to emulate location-specific RF environments including propagation and interferers Requirements for conditions not realizable on evaluation ranges including prohibition by FCC rules RF environment control difficult due to encroachment of commercial RF sources.

All of the above lead to increased costs, longer schedules, more requirements on field evaluation assets and ranges, and potentially lower confidence in results.

For adaptive RF systems, field evaluation is not practical. Laboratory evaluation methods are generally more cost and schedule effective, are more controllable and observable, but generally are lacking in realism, especially with respect to RF environmental considerations including other RF sources.

There exist many variations of lab evaluation approaches, but they can be generally bounded by "RF Path Simulator" and "Software Modeling" variants. The RF Path Simulator approach shown in FIG. 2, which interconnects RF systems/devices with conventional laboratory test equipment such as signal/noise generators, is only applicable to simple RF environments, small numbers of devices/systems under test with simple antenna systems, and small number of primary users/interferers. Lab-based evaluation using cable-based interconnection for RF emissions of UUT and the RF environment is a prior art approach to testing to overcome the challenges of placing and monitoring devices in the field environment. FIG. 2 depicts a typical lab-based equipment setup. As in field evaluations, Wireless Transceiver Units Under Test (UUT) 100 are acquired and instrumented with Test Instrumentation 120. Instead of the RF environment being that found in the field, RF test equipment such as signal generators are used to produce Interferers 210, Noise Generators 220, and Path Simulators 200 to simulate path loss and multipath in an RF channel. RF Interconnection 230 is accomplished using RF cables such as coaxial cables. This test set up approach reduces some of the complexities of field evaluation, but introduces new concerns over RF environment realism. Further, it still requires the physical introduction of new UUT and RF test equipment into the configuration for comprehensive transceiver configuration and RF environment results.

Traditional methods that use software modeling approaches as shown in FIG. 3 have historically made simplifications about the physical environment/radio propagation effects, and generally cannot support any hardware in the loop (HITL) test cases. Their validity is therefore limited to a narrow group of test cases and not well suited to the adaptive RF system evaluation problem. A variation on RF cable-connected lab testing has become more prevalent and straightforward as wireless transceiver devices have tended towards digital waveforms and digital hardware or software implementation. FIG. 3 depicts a typical framework for modern wireless communications devices as defined by the prior art OSI model. Here, different functions in the Wireless Transceiver 100 are allocated to layers in the functional stack 300. The physical layer in stack 300 is where the waveform-related functionality is contained. The physical layer can be segregated into a digital implementation portion 310 and an analog portion 320. Typical functions in the digital transmit portion 310 are waveform generation 330 and digital to analog conversion 340. Typical functions found in the analog portion 320 are baseband to RF conversion 350. Other digital processing functions associated with non-physical layers (2 through 7) are performed through digital data processing blocks 360.

A laboratory-based evaluation approach that combines the advantages of true RF path/environment emulation and HITL, but implemented in the digital domain under software control, has the potential to deliver the advantages of the different lab methods with the realism of field testing. The test platform disclosed in commonly owned U.S. Pat. No. 8,521,092, titled "Wireless Transceiver Test Bed System and Method", which is hereby incorporated by reference, follows this approach. The present disclosure adds improvements directed to a system and method for providing a laboratory-based, field realistic, virtual RF environment where RF systems (communications, radar, jammers, etc.) produced by unassociated third parties can participate in an interactive gaming environment to evaluate behavior. This facet of the test bed problem is further described below.

FIG. 4 of U.S. Pat. No. 8,521,092, titled "Wireless Transceiver Test Bed System and Method" is included as FIG. 4 in the current disclosure to describe the operation of one embodiment. FIG. 4 illustrates the virtual wireless channel (VWC) 400 and test instrumentation plane (TIP) and metadata manager 410. The TIP may also be embodied as a database. The UUT physical layer digital portion is connected to the VWC 400 via interconnections 420, as is the TIP via 425. The VWC function is to provide a realistic wireless channel model including noise, interference, UUT signal path loss and UUT signal multipath transmission. The VWC 400 can be configured with a selectable number of virtual spectrum users (VSU) and other interferers to accurately simulate the RF environment that might be encountered in different parts of the world. The VSU may have selectable interactivity parameters, including transmission parameters and kinetics, or physical characteristics. For example, transmission parameters may include frequency, bandwidth, power, modulation. Physical characteristics, or kinetics, may include location, speed, direction of motion, and antenna parameters including type, elevation gain, azimuth gain, phase, polarization and orientation. The VSU can be selected to be a transmitter only, a receiver only or a transceiver. The VSU can be selected to be a communication device, a sensor such as a radar, a navigation device, or a jammer and can be the same type or different than the UUT. The VWC also allows for selecting transmission parameters and physical characteristics of the physical UUT.

A key feature of the VWC is that it accepts and passes analog RF or digitized RF to and from the UUT. In this way, the full effects of the wireless channel can be included in the simulation. The TIP 410 acts as a control mechanism to orchestrate the sequencing of the test bed simulation, and to collect instrumentation data at the RF and other OSI layers of the UUT. A key part of the TIP is the metadata manager. Metadata is defined as data that must be passed between the VWC and the UUT to allow real time parameters to be modeled and analyzed. As an example, metadata can include the relative locations of the UUT and VSU in a geographic region. As the simulation progresses, the delay characteristics of the multipath and relative time of arrival of the signals at each node can be accurately modeled.

Perhaps the most challenging part of adaptive RF system behavior evaluation is addressing the interaction between RF systems (including adaptive RF systems) in the field. An anticipatable adaptive RF system behavior pattern ("system 1") may be that it adapts in response to another RF system ("system 2") in the field (like changing RF frequency of operation), which causes system 1 to adapt (like lowering its transmission pattern), which causes system 2 to adapt (by changing RF frequency back to its original center frequency), and so on. These conditions are not producible in the field or laboratory today, in part, because many of the adaptive RF systems that will be in the field in the future do not exist today in either a "test equipment" form or "prototype form" to facilitate behavior evaluation. In fact, many future adaptive devices are only available as laboratory R&D models in university, commercial and government R&D facilities.

Based on a review of the available RF system test beds that exist in industry and academia (including those referenced in U.S. Pat. No. 8,521,092), a wireless transceiver test bed approach, capable of allowing unassociated third parties to participate in interactive spectrum gaming environments to evaluate behavior is not known.

The present disclosure utilizes emerging technologies and trends in the areas of computer networking, digital signal processing, wireless device design, wideband networks, computer and software architecture/capability and software-based modeling to provide a means to address these shortcomings. Specific technology innovations that contribute to various aspects of the present disclosure include:
  digital signal processing power and available algorithms
    and models
  ability to digitize RF with high fidelity emerging software defined radio (SDR) software architectures, such as SCA (Software Communications Architecture)

emerging commercial off-the-shelf digital radio and SDR components (hardware and software)

ever increasing broadband connectivity between distributed sites comprehensive and advanced RF propagation models RF emitter models being built in software proliferation of radio functionality being digital and implemented in software with discrete events (bits, bursts, frames, etc.).

standardization of baseband digitized interfaces to SDRs (such as the VITA-49 Radio Transport Protocol).

The present disclosure is not limited to adaptive wireless devices in the application area of communications, but broadly applies to all wireless devices and networks including receive only, transmit only and diverse applications such as sensing, radar, and jamming. Further, it is not limited to behavior evaluation of adaptive RF systems and could also be used to evaluate conventional RF systems.

In summary, a large number of organizations are involved in the development of adaptive RF systems including industry, academia, and government. Methods, tools, and metrics to collaboratively and comparatively judge the behavior of these systems (either individually or interactively) do not exist. Progress in maturing the designs for cognitive RF systems, understanding their performance, and introducing them into the field are hampered by the lack of behavior evaluation capabilities. The disclosed system provides a means to enable the behavior evaluation in a cost effective and engaging way.

SUMMARY OF DISCLOSURE

The disclosed system creates an interactive virtual RF environment where RF devices operate and/or compete with other RF devices or the environment. A useful analogy is a video game where opposing players create real time strategies to battle each other or the computer-controlled enemy; or where many players participate in a massively multi-player online role-playing game (for example, the commercial game Warcraft).

The disclosed system could be used in a fashion comparable to the DARPA robot challenge. DARPA's goals for robot challenge are similar to the use goals for the disclosed system which are: facilitating the development of advanced robotic capabilities; making robot technology more accessible, and creating a widely available, validated, affordable, community-supported, and enhanced virtual test environment (DARPA equates this last goal to the development of SPICE (Simulation Program with Integrated Circuit Emphasis) for integrated circuits). A key attribute of the DARPA robot challenge virtual test environment is eliminating the need for physical prototyping in the evaluation of hardware and software designs. Similarly, a key attribute of the proposed system is to allow developmental cognitive RF system designs to be evaluated without creating a full RF hardware suite by implementing the testing at digital baseband ("digitized RF", where the RF hardware can be modeled if desired). The disclosed system also make available RF system building blocks to challengers to build new RF systems.

In one aspect, the present disclosure is a method of evaluating interacting RF devices, including receiving selected interactivity parameters for a first virtual spectrum user, receiving selected interactivity parameters for a second virtual spectrum user, providing a virtual RF environment for the first and second remote spectrum users, evaluating the performance of the first and second virtual spectrum users in the virtual RF environment, assigning a score to the first virtual spectrum user as a function of the evaluated performance of the first virtual spectrum user, assigning a score to the second virtual spectrum user as a function of the evaluated performance of the second virtual spectrum user, and identifying whether the first or second virtual spectrum user was assigned the higher score.

In another aspect, the present disclosure is a system for evaluating interacting RF including a first virtual spectrum user having first selectable interactivity parameters, a second virtual spectrum user having second selectable interactivity parameters, a first remote user for controlling the first virtual spectrum user through a first web browser, a second remote user for controlling the second virtual spectrum user through a second web browser, a real-time modeler processor responsive to the first and second virtual spectrum users in real time to track the physical location of the first and second virtual spectrum users, a virtual spectrum processor responsive to the real-time modeler processor to emulate a virtual RF environment in which the first and second virtual spectrum users operate, a database of the first and second selectable interactivity parameters for the first and second virtual spectrum users in communication with the first and second remote users, and an evaluation processor for evaluating the performance of the first and second virtual spectrum in the virtual RF environment and assigning a score to the first and second virtual spectrum users as a function of the evaluation.

The disclosed system incorporates functionality from two sources. The first is the test platform disclosed in commonly owned U.S. Pat. No. 8,521,092 titled "Wireless Transceiver Test Bed System and Method". In this disclosed system, third parties can attach "spectrum users" at digital baseband through an open interface and interact with the virtual RF environment including accurate propagation (terrain-appropriate path loss, fading, multipath, Doppler, and delay), host platform motion, antenna patterns, environmental interferers, other spectrum users, etc. Second, the disclosed system architecture can be implemented with IP interconnections, which facilitates third party/multi-platform configurations, and also allows processing and GUI functions to be separated and operated via a web browser or similar means. With these features, the functionality of remote users operating their RF systems through their web browsers while interacting with other RF systems in a virtual RF environment can be realized.

With reference to FIG. 5, in one embodiment, the disclosed system allows virtual spectrum users (VSUs), attributable to third parties, to exist in the Software-based Emulation Platform 500. These VSUs can be provided by third parties, and/or controlled/monitored by third parties. For disclosure clarity, we will refer to these VSUs as being Contestant VSUs, and the operator of the Software-based Emulation Platform as the Spectrum Master. FIG. 5 shows these Contestant VSUs 530 in the context of the Software-based Emulation Platform. Their interconnection to the other functions in the Software-based Environment Emulator are substantially similar to those for non-Contestant VSUs 540. Contestant VSUs 530 can be controlled and/or monitored remotely through the internet 520 using Contestant Clients 510. For disclosure clarity, we will refer to a time session where VSUs interact with the Virtual Wireless Channel 550 and Instrumentation data 560 is collected as "Spectrum Wars" ("game duration or period over which VSU behavior is being evaluated).

The following is an example of a Spectrum Wars game scenario to illustrate how strategies and scoring can occur. Some number of parties participate in the game. The first participant is the Spectrum Master who establishes the conditions for the game including the geographic area, the spectrum availability rules ("policy") and number/identity/roles of the players. The other players compete for points during the game ("Contestants"). Contestants may provide a communications link/network/jammers/radars/etc. as VSUs 530, configured in the context of the spectrum policy and the selected geographic area. He also selects a vehicular host platform and antenna system.

The contestants gain points as the session progresses by performing their intended function (i.e. communicating), and/or not interfering with other contestants. As the game progresses, all players have displays showing selected geographic and spectral activity, information about the behavior of their VSU, and scoring information. The Spectrum Master has access to all information (it is also recorded for post analysis). Each contestant has access to other contestant information through the emulated spectrum only, just as in the real-world.

DETAILED DESCRIPTION

Figure 1:
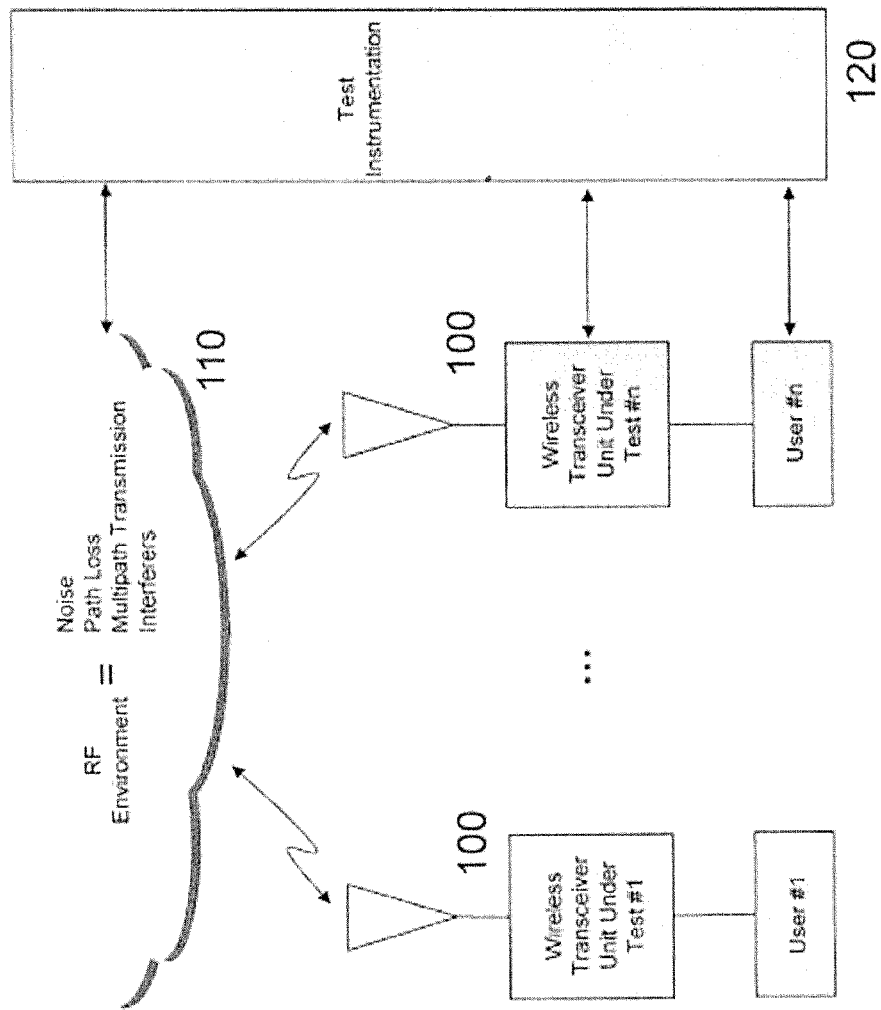
FIG. 1 is a simplified block diagram illustrating the components in a typical prior art field-based testing configuration for an RF device or system.
Figure 2:
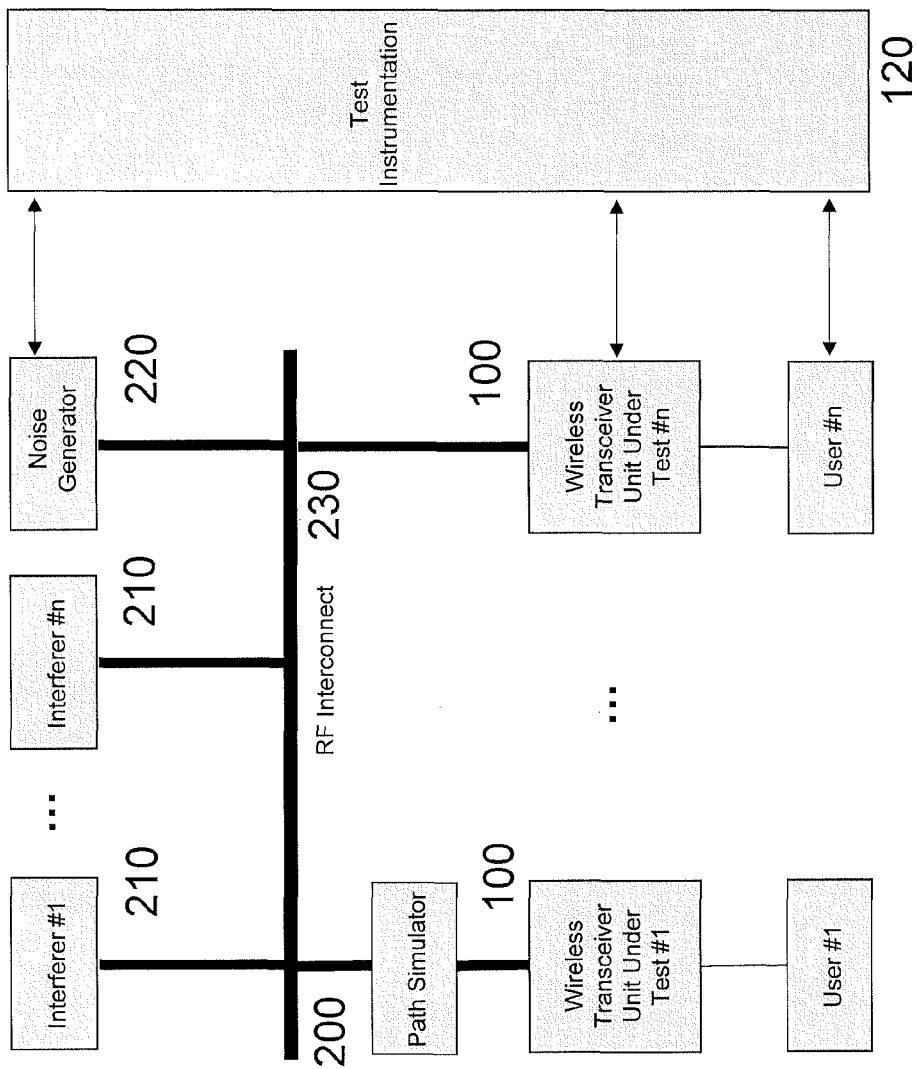
FIG. 2 is a simplified block diagram illustrating the components in a typical prior art RF interconnected laboratory-based testing configuration for an RF device or system.
Figure 3:
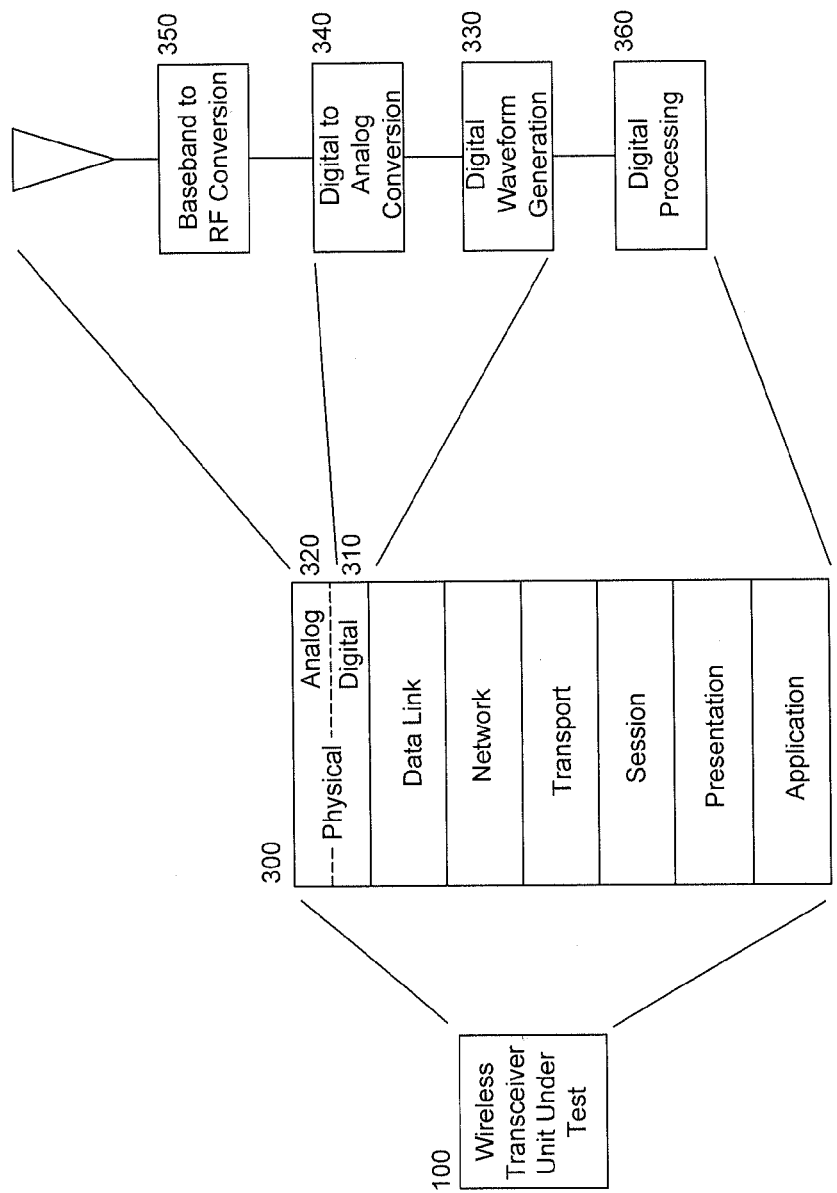
FIG. 3 is a simplified block diagram illustrating the components in a typical prior art software model-based testing configuration for an RF device or system.
Figure 4:
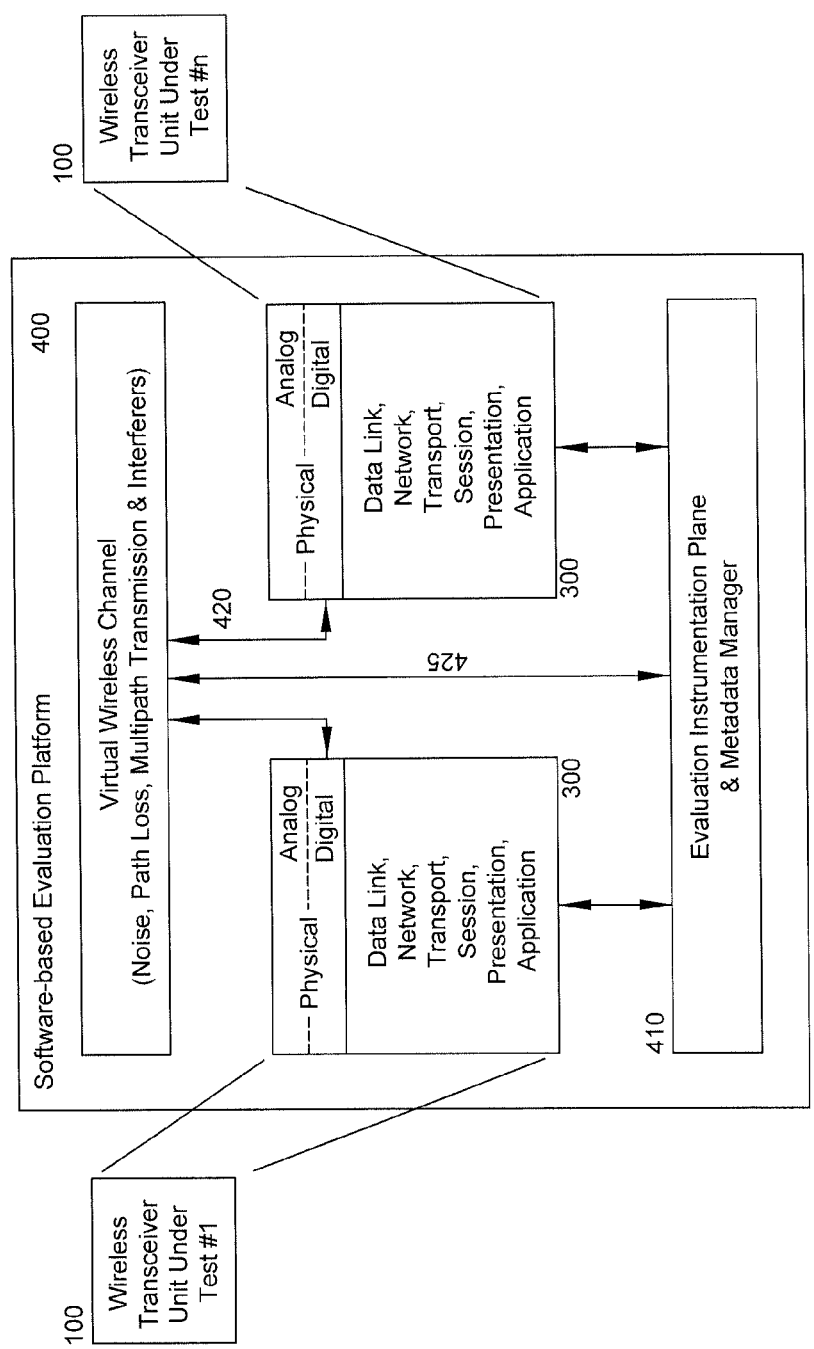
FIG. 4 is a simplified block diagram illustrating the placement and function of a virtual wireless channel in a laboratory-based testing configuration for use in the present disclosure.
Figure 5:
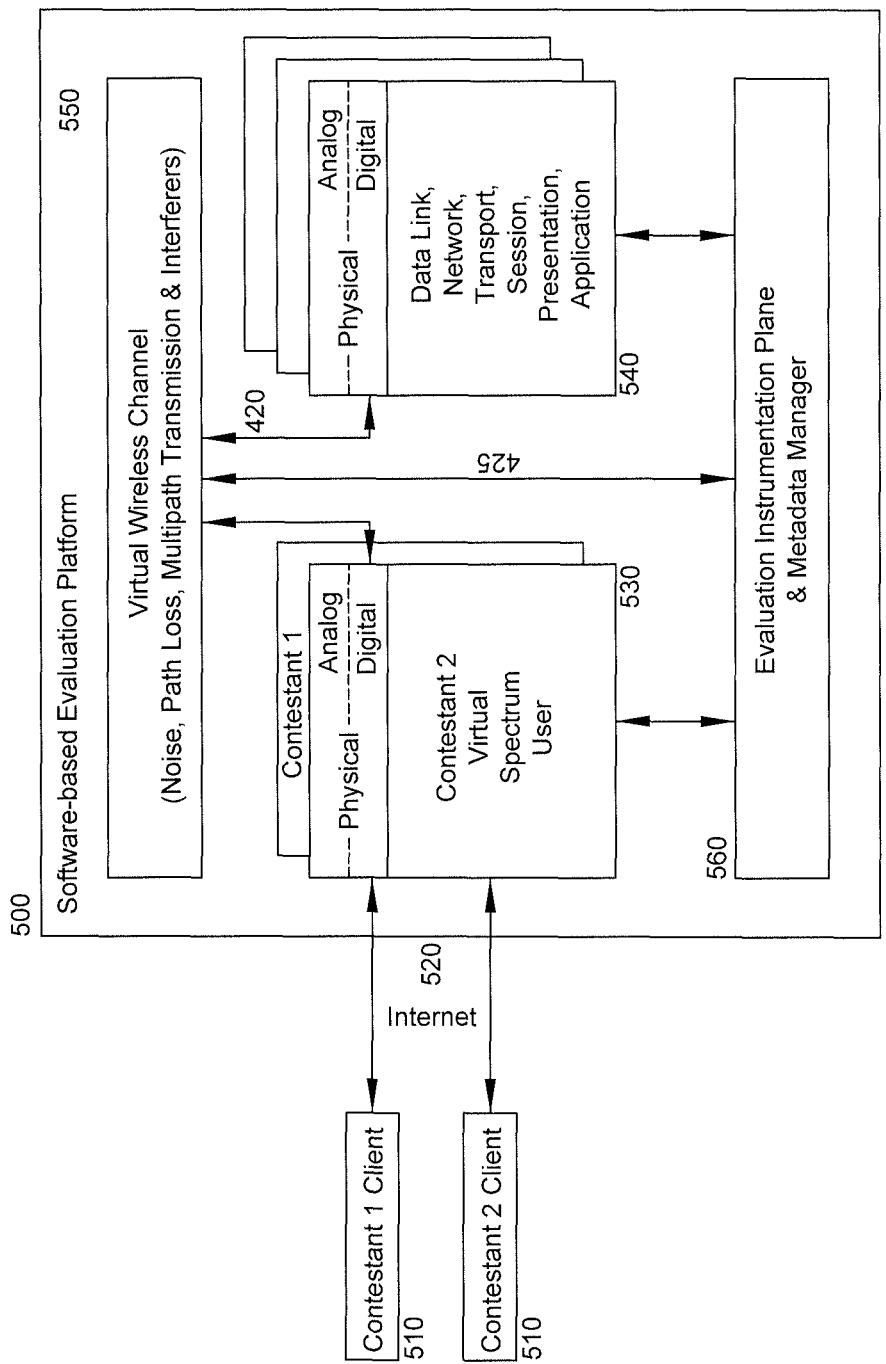
FIG. 5 is a is a simplified block diagram illustrating one embodiment of the present disclosure showing the placement and function of a Contestant VSUs and Contestant Clients interconnected over the internet.
Figure 6:
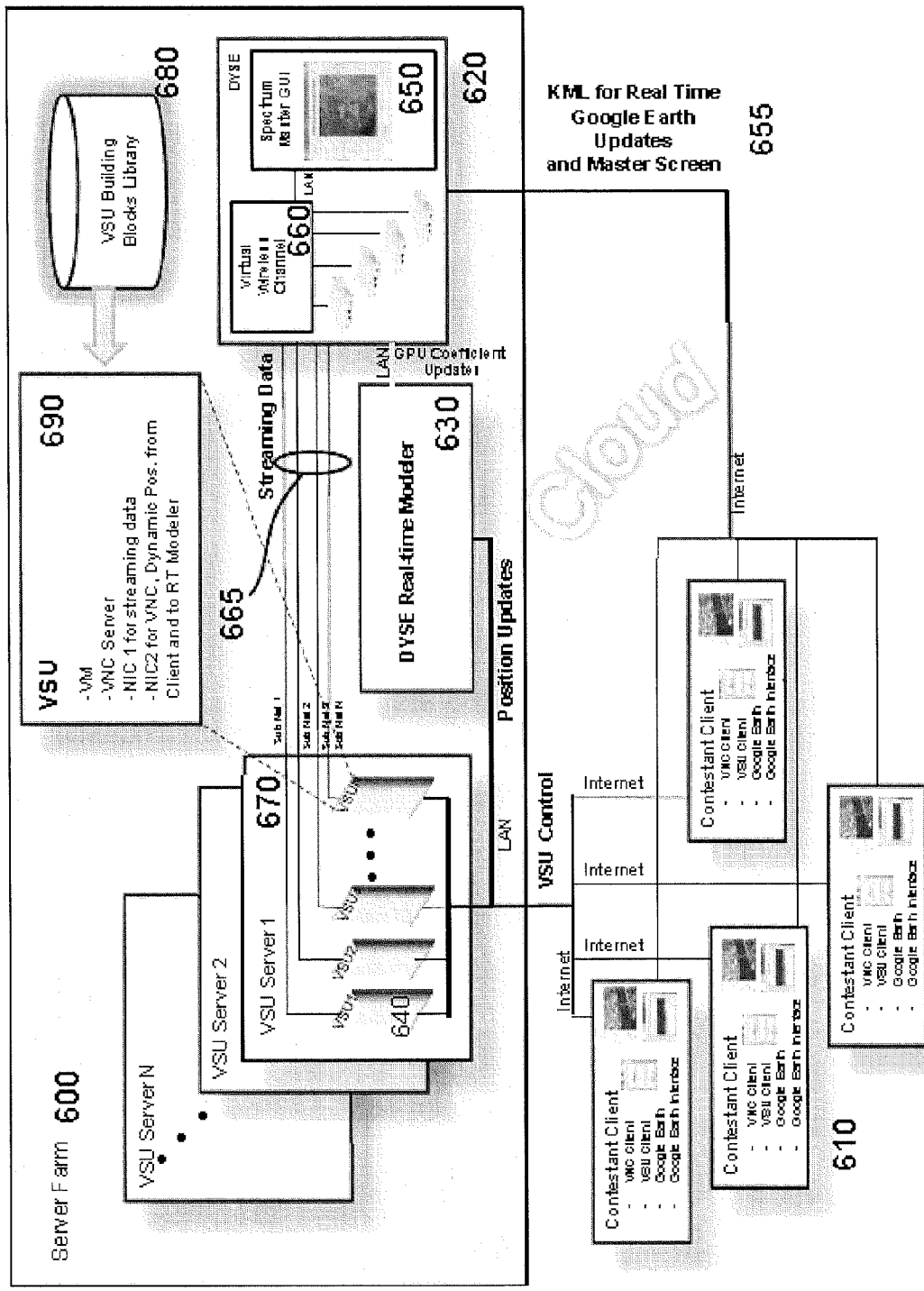
FIG. 6 illustrates one embodiment of a Software-based Evaluation Platform with components to support Spectrum Wars.

FIG. 6 illustrates one embodiment of a distributed system architecture used to host "Spectrum Wars". In its simplest form, it is comprised of two distinct components. The first component is a locally hosted Server Farm 600 which provides much of the computational power for the game. The second component includes Contestants Clients 610 that interface with the Server Farm 600 via the internet.

Furthermore, the server farm is made up of the DYnamic Spectrum Environment emulator (DYSE) 620, the DYSE Real-Time Modeler 630 and any number of VSU hosts 640. DYSE 620 provides an interface for the Spectrum Master via the Spectrum Master GUI 650, and also serves as the RF emulation host via the Virtual Wireless Channel 660. In this embodiment, DYSE 620 functionality can be distributed between two compute hosts, the Spectrum Master GUI 650 and the VWC 660. The Spectrum Master GUI 650 may be any specially programmed general purpose computer, such as a Windows PC. The Spectrum Master GUI may be specifically programmed to specify the entire RF operating environment. This may include specifying the contest location and time, the Contestant VSUs, the primary users, the jammers, etc., the contest duration, the rules of the game and scoring method. In this embodiment, the DYSE virtual wireless channel 660 may be implemented by graphics processor units (GPUs) ("GPU Engine"). The DYSE GPU Engine may be a high powered, multi GPU based Linux PC which emulates the propagation path between all RF entities in the contest in real time. FIG. 9 illustrates one embodiment of a DYSE GPU Engine.

With reference to FIG. 6, the VSU Hosts 640 may be implemented as virtual machines that reside on a separate server class PC (VSU Server 1 . . . VSU Server N 670). In one embodiment, there is one VSU Host per contestant and per primary user, jammer, etc. The number of allowable contestants may scale with the number of server class PCs in the Spectrum Wars system architecture. Although VSU Hosts are associated with contestants, in one embodiment, it is desirable to host them locally in the Spectrum Wars system architecture due to the bandwidth requirements of VSUs, which cannot be guaranteed over the bandwidth limited internet.

The Contestant Clients 610 can communicate remotely via for example, a web browser into their respective VSU hosts 640. They can be thought of as "remote desktop" clients. Using this approach, complete control of VSUs by the contestants can be achieved without requiring the VSUs to reside locally on the Contestant Client.

In a typical operational scenario, the Spectrum Master sets up the game. For each contestant in the game, the Spectrum Master 650 signals the VSU Server(s) 670 to instantiate a VSU Host 640 and then initiates the RF emulation on the DYSE GPU Engine 660. During the RF emulation, each VSU Host 640 and thus each contestant 610 streams IF/Digital data 665 to the DYSE GPU Engine 660. While this is happening, the Contestant Client 610 has full visibility into, and control of, his respective VSU 690 and can alter (through prior VSU programming or in real time) signal strength, wave form, frequency, etc. to try and score points.

In addition to the components described above, a VSU Building Blocks Library 680, which may reside in a database on a server farm, can be used by contestants to construct their VSU 690. The VSU Building Blocks Library 680 is comprised of VSU components that can be linked together to fully define a VSU.

In one embodiment, a Real Time Modeler (RTM) 630 can be incorporated on another distributed host in the Spectrum Wars architecture to allow Contestants the additional flexibility of changing their VSU physical location during the emulation. For example, the VSU Hosts 640 can communicate their new location, as specified by the Contestant Client 610, to the RTM 630. The RTM 630 in turn, re-computes the propagation path coefficients associated with all transmit and receive paths affected by this change in position, and passes them to the DYSE Compute Engine 660 to be used in real time path loss calculations. In one embodiment, the Spectrum Master creates 650 a KML stream 655 representative of the entire scenario. The stream is sent to each Contestant Client 610 and is fed to Google Earth via a resident custom application. Google Earth will display a global map of the scenario. FIG. 10 illustrates one embodiment of a real time modeler.

Before the game begins the Spectrum Master decides which contestants will participate and notifies them for (for example, via email) of their selection. It also informs them of other necessary game related administrative information such as their location (IP) and (remote desktop login) credentials.

Figure 7:
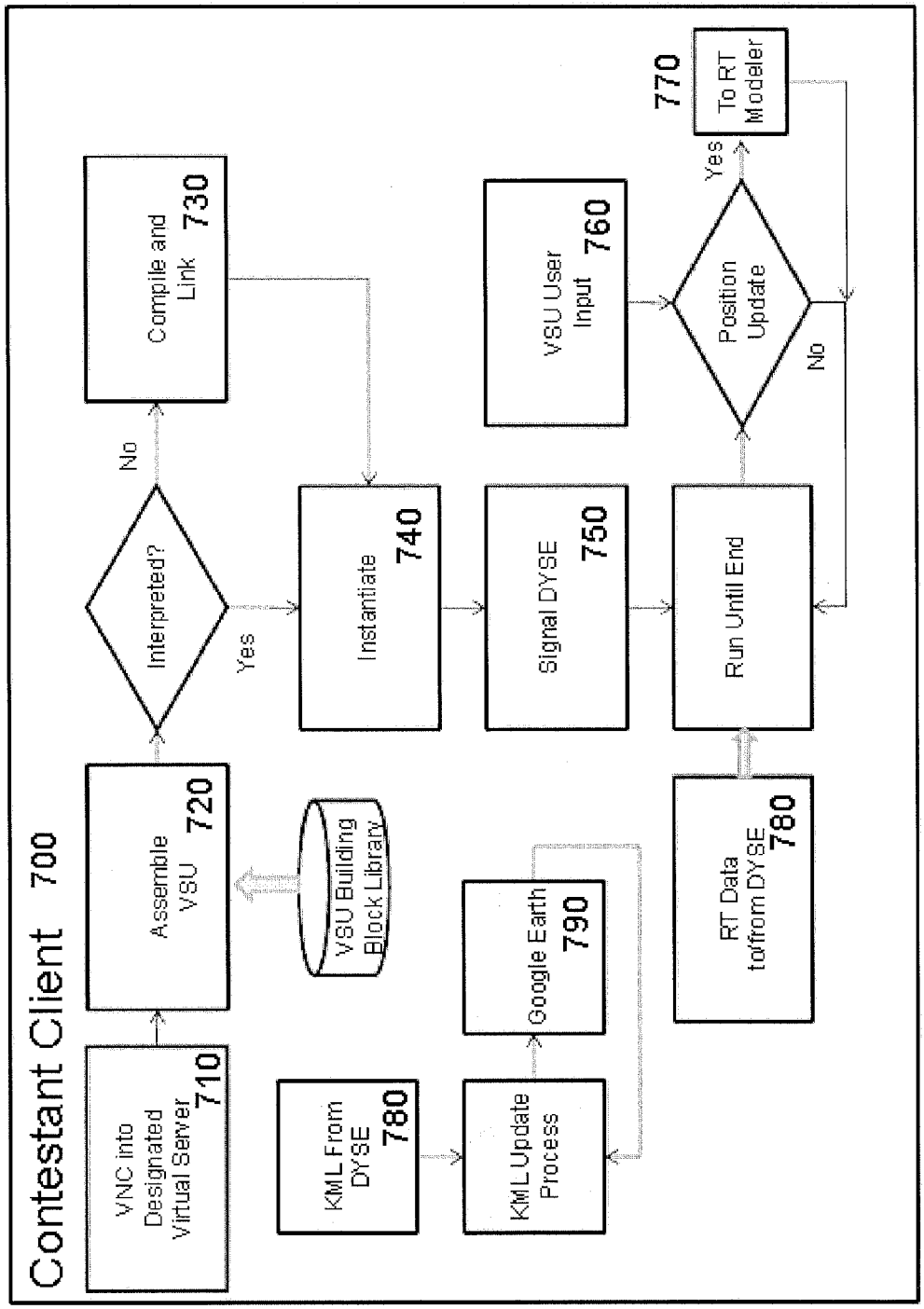
FIG. 7 illustrates one embodiment of a Contestant Client operational flow.

FIG. 7 is block a diagram of one embodiment of a Contestant Client 700. Upon receiving credentials, the Contestant may log into his respective VSU host 710 and can either assemble his VSU from the VSU Building Blocks Library 720 or select a previously built VSU. VSUs can be written in either an interpreted programming language (Matlab, Python) or a compiled programming language (C/C++). If the language is compiled than it must be built and assembled directly on the VSU Host 730. In one embodiment, it cannot be built locally as the Contestant Client Host CPU may not match that of the VSU Host Server, which is where it will be executed. Interpreted languages have no dependency on CPU architecture so they can be constructed anywhere, although they too must be executed on the VSU Host. Once the VSU has been created or selected, it is then loaded onto the VSU host and instantiated 740. Next, signaling to and from DYSE is established 750 and the processes begin execution. During execution, the contestant, who now controls aspects of his VSU through a web browser interface 760, may relocate the VSU. If he chooses to change position, then the new location is passed to the RTM 770. In one embodiment, during execution, IF/Digital data is passed to/from DYSE to/from the VSU 780. Execution continues until the game ends.

The shaded blocks in FIG. 7 represent one embodiment of a method used to give each Contestant Client full visibility into the entire scenario. In addition to what is described above, the Spectrum Master creates a KML stream representative of the entire scenario[780. The stream may be sent to each Contestant Client and is fed to Google Earth via a resident custom application. Google Earth will display a global map of the scenario 790.

Figure 8:
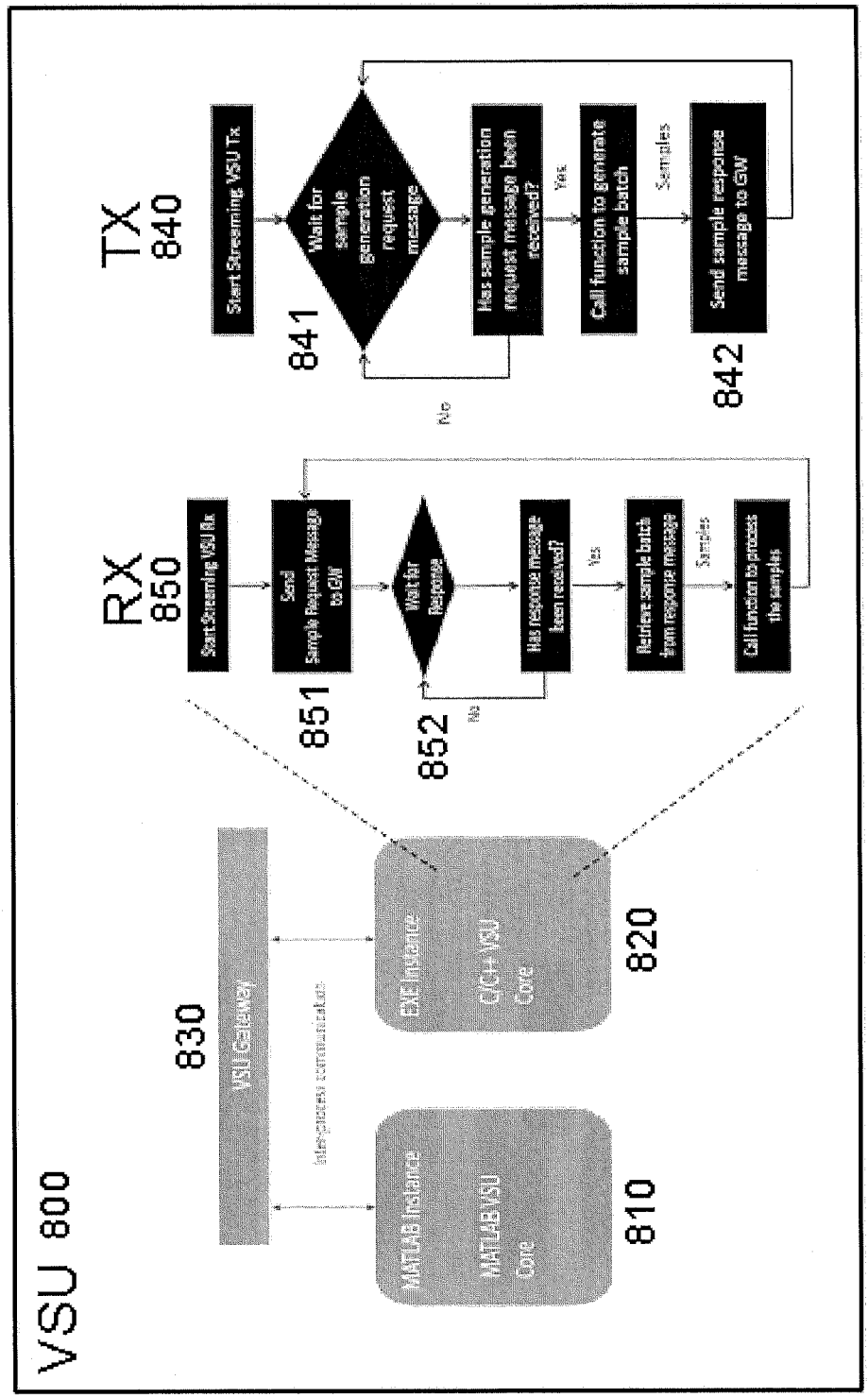
FIG. 8 illustrates one embodiment of the functional flow of a VSU to support streaming data transfer.

FIG. 8 shows a functional block diagram of one embodiment of a streaming VSU 800. In this embodiment, VSUs can either be interpreted (Matlab) 810 or compiled (C/C++) 820. In either case all communications to DYSE are provided through a VSU Gateway 830 that may reside on the VSU Host 800. This effectively abstracts the details of the low level communications channel from the VSU developer. The API for communications with the VSU Gateway 830 is simple and well documented. Also shown in FIG. 8 is a flow chart identifying one embodiment for both transmit 840 and receive VSUs 850. Receiver VSUs 850 may receive sample data by sending requests to DYSE 851. They then may wait until DYSE responds with a batch of sample data and then process it. Processing usually entails executing an algorithm on the data and then visually displaying the processing results 852. This may lead to altering the processing on subsequent batches of data. Transmitter VSUs operate in reverse fashion. Initially a transmitting VSU may receive a data request [841] from the gateway and then it generates samples as prescribed by an algorithm. It then stuffs those samples into a batch data message response and forwards that message to the gateway[842. The gateway sends the data on to DYSE.

In one embodiment, the present disclosure can be used in the context of a Spectrum Wars game scenario, For example, four parties participate in the game. The first participant is the Spectrum Master who establishes the conditions for the game including the geographic area, the spectrum availability rules ("policy") and number/identity/roles of the players. The other three players compete for points during the game ("Contestants"). The first Contestant provides a communications link/network as VSUs, configured in the context of the spectrum policy and the selected geographic area. He also selects a vehicular host platform and antenna system. The second Contestant provides a jammer as a VSU. He also configures the VSU and selects a vehicular host platform and antenna system. The third Contestant provides a set of "primary users" as VSUs who are stationary in the geographic area. He also configures the VSU and selects locations for his primary users (in accordance with Spectrum Master guidance).

The contestants gain points as the session progresses as follows:
  the communications network gains points by measuring throughput on his link(s), and loses points when he interferes with primary users
  The jammer gains points when he reduces throughput of the communications network link(s), and loses points when he interferes with primary users
  the primary users gain points when they detect that the communications or jammer contestants are creating interference in the primary user systems.

As the game progresses, all players have displays showing selected geographic and spectral activity, information about the behavior of their VSU, and scoring information. The Spectrum Master has access to all information (it is also recorded for post analysis). Each contestant has access to other contestant information through the emulated spectrum only, just as in the real-world. Contestants are free to execute their own algorithms and signal processing techniques in the VSU as needed for their own application areas (spectral sensing, DF, geolocation, exploitation, jamming, spoofing, etc.). A handicapping scheme is used to normalize point scoring and deductions to arrive at a game winner.

Another example of a Spectrum War example is an embodiment with three parties participate in the game. The first participant is again the Spectrum Master who establishes the conditions for the game including the geographic area, the spectrum availability rules ("policy") and number/identity/roles of the players. The other two players compete for points during the game ("Contestants"). These two Contestants provides communications link/network as VSUs, configured in the context of the spectrum policy and the selected geographic area. They also select a vehicular host platform and antenna system.

The contestants gain points as the session progresses as follows:
  the communications network gains points by measuring throughput on his link(s), and loses points when he interferes with primary users installed in the scenario by the Spectrum Master
  the contestant with the most points at the end wins
  this game pits two like VSU against one another vs. the prior game which included three different types of VSUs as contestants.

As the game progresses, the players again have displays showing selected geographic and spectral activity, information about the behavior of their VSU, and scoring information. The Spectrum Master has access to all information (it is also recorded for post analysis). Each contestant again has access to other contestant information through the emulated spectrum only, just as in the real-world.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, a composition of matter affecting a machine-readable propagated signal, or a combination of one or more of them.

The term "circuitry" encompasses all apparatus, devices, and machines for processing data, including by way of example a programmable processor, a computer, or multiple processors or computers. The circuitry can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed:

1. A method of evaluating interacting RF devices, comprising:
   receiving selected interactivity parameters for a first virtual spectrum user from a first contestant;
   receiving selected interactivity parameters for a second virtual spectrum user from a second contestant,
   wherein the first and second contestants are not coordinated with each other and each contestant is not aware of the selected interactivity parameters from the other contestant;
   providing a virtual RF environment for the first and second spectrum users wherein the selected interactivity parameters for the first virtual spectrum user controls the operation of the first virtual spectrum user and affects the performance of the second virtual spectrum user;
   evaluating the performance of the first and second virtual spectrum users in the virtual RF environment;
   assigning a score to the first virtual spectrum user as a function of the evaluated performance of the first virtual spectrum user;
   assigning a score to the second virtual spectrum user as a function of the evaluated performance of the second virtual spectrum user; and
   identifying whether the first or second virtual spectrum user was assigned the higher score.

2. The method of claim 1 wherein the virtual RF environment includes noise, propagation loss, multipath transmissions and interferers.

3. The method of claim 1 wherein the selected interactivity parameters are provided from a remote location through a web browser during the step of evaluating.

4. The method of claim 3 wherein the selectable interactivity parameters include frequency, bandwidth, power and modulation.

5. The method of claim 3 wherein the selectable physical characteristics include location, speed, direction of motion, and antenna parameters.

6. The method of claim 5 wherein the antenna parameters include type, elevation, gain, phase polarization and orientation.

7. The method of claim 1 wherein the first virtual spectrum user is a communication network.

8. The method of claim 1 wherein the second virtual spectrum user is a jammer.

9. The method of claim 7 wherein the second virtual spectrum user is a primary user of the communication network having a selectable stationary location.

10. The method of claim 9 wherein the primary user is at least one of a radar, a navigation device, or a television transmitter.

11. The method of claim 8 wherein the second virtual user is assigned points as a function of reducing the throughput of a communications network in the virtual RF environment.

12. The method of claim 7 wherein the first virtual user is assigned points as a function of the measured throughput of the communications network.

13. The method of claim 9 wherein the second virtual user is assigned points as a function of detecting a jammer in the virtual communications network.

14. The method of claim 1 further including the step of changing the virtual RF environment in real-time and evaluating and assigning scores to the first and second virtual spectrum users in the changed virtual RF environment.

15. The method of claim 1 further comprising the step of displaying the assigned score to the first and second virtual user.

16. The method of claim 1 further comprising displaying the geographic location of the virtual RF environment and the location of the first and second virtual uses on a map.

17. A system for evaluating interacting RF devices, comprising:
    a first virtual spectrum user having first selectable interactivity parameters controlled by a first contestant through selection of the first selectable interactivity parameters;
    a second virtual spectrum user having second selectable interactivity parameters controlled by a second contestant through selection of the second selectable interactivity parameters;
    wherein the first and second contestants are not coordinated with each other and each contestant is not aware of the selected interactivity parameters from the other contestant;
    a real-time modeler processor responsive to the first and second virtual spectrum users in real time to track the physical location of the first and second virtual spectrum users;
    a virtual spectrum processor responsive to the real-time modeler processor to emulate a virtual RF environment in which the first and second virtual spectrum users operate wherein the selected interactivity parameters for the first virtual spectrum user controls the operation of the first virtual spectrum user and affects the performance of the second virtual spectrum user;
    a database of the first and second selectable interactivity parameters for the first and second virtual spectrum users in communication with the first and second contestants through the respective first and second web browsers;
    an evaluation processor for evaluating the performance of the first and second virtual spectrum in the virtual RF environment and assigning a score to the first and second virtual spectrum users as a function of the evaluation.

18. The system of claim 17 wherein the first virtual spectrum user is a first communication network and the second virtual user is a second communication network, and the evaluation processor assigns points to the first and second virtual spectrum user as a function of a measured throughput on their respective communication networks.

19. The system of claim 17 wherein the virtual RF environment includes noise, propagation loss, multipath transmissions and interferers.

20. The system of claim 17 wherein the first and second selected interactivity parameters include selectable transmission parameters and selectable physical characteristic controllable from a remote location through a web browser.

21. The system of claim 20 wherein the selectable interactivity parameters include frequency, bandwidth, power and modulation.

22. The system of claim 20 wherein the selectable physical characteristics include location, speed, direction of motion, and antenna parameters.

23. The system of claim 22 wherein the antenna parameters include type, elevation, gain, phase polarization and orientation.

24. The system of claim 17 wherein the first virtual spectrum user is a communication network and the second virtual user is a jammer and the evaluation processor assigns points to the first virtual spectrum user as a function of a measured throughput on the communication network and assigns points to the second virtual spectrum user as a function of reducing the throughput on the communications network.

\* \* \* \* \*